No. 648,179. Patented Apr. 24, 1900.
J. SHELLENBERGER.
VEHICLE WHEEL.
(Application filed Aug. 14, 1899.)
(No Model.)
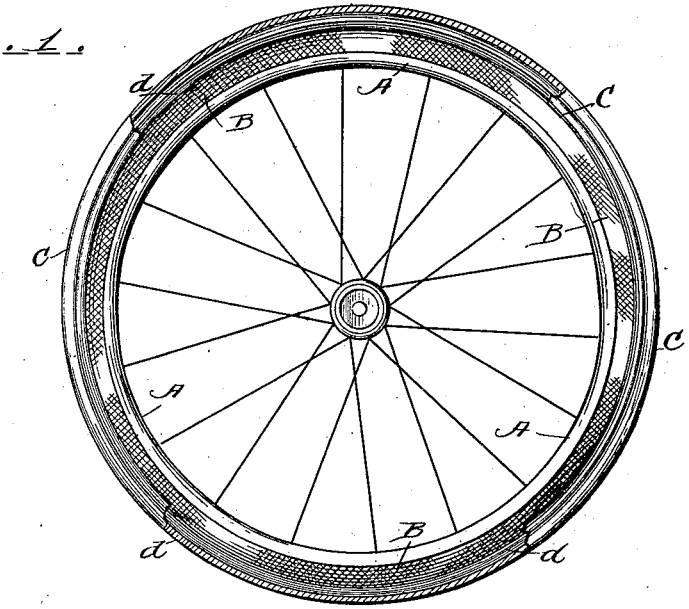
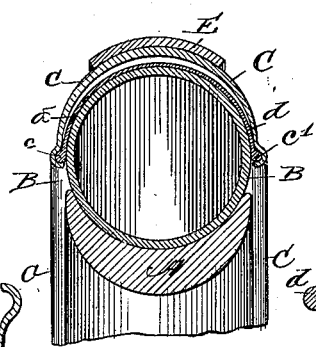
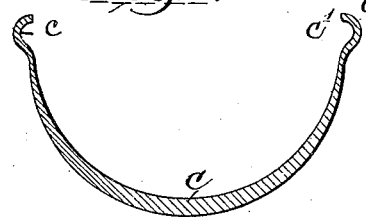
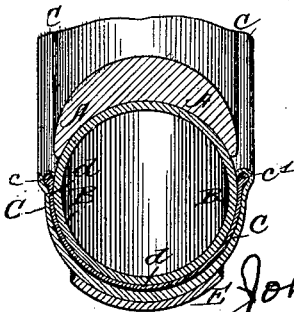
Witnesses:
Henry B. White.
R. White.
Inventor:
John Shellenberger
By Free Daiw Attorney.
THE NORRIS PETERS CO., PHOTO-LITHO., WASHINGTON, D. C.

UNITED STATES PATENT OFFICE.

JOHN SHELLENBERGER, OF DAVENPORT, IOWA.

VEHICLE-WHEEL.

SPECIFICATION forming part of Letters Patent No. 648,179, dated April 24, 1900.

Application filed August 14, 1899. Serial No. 727,154. (No model.)

*To all whom it may concern:*

Be it known that I, JOHN SHELLENBERGER, a citizen of the United States, residing in Davenport, county of Scott, and State of Iowa, have invented certain new and useful Improvements in Vehicle-Wheels; and I do hereby declare the following to be a full, clear, and exact description, such as will enable persons who are skilled in the art to which it appertains to make and use the same.

My invention has reference to improvements in vehicle-wheels, and especially to that class of wheels wherein the tires are made of a soft yielding substance, such as rubber, and the resilience of such material is relied upon to produce a smooth elastic motion or wherein a rubber tire surrounds the rim of the wheel and the interior of the tube is filled with compressed air, such a construction being commonly known as "pneumatic" tires.

One object of my invention is to provide an armor for the outside surface of the tires such as described, for the purpose of protecting the said tires against rapid and excessive wear and for the further purpose of protecting pneumatic tires from the additional danger of being punctured.

A further object of my invention is to provide a means for operatively associating the said armor-tire with the ordinary yielding tire, whereby the effective resilience of the said rubber tire may be increased as compared with wheels provided with cushion or pneumatic tires that are unprovided with my improved armor-tire, and whereby the resilience of the said armor-tire of itself may be made to contribute to the effect produced by the resilience of the aforesaid yielding tires.

A still further object of my invention consists in producing, in effect, an endless smooth metal track for the said rubber tire to roll upon, consisting of an annular internal arched ring of metal, preferably made of thin spring sheet-steel, somewhat larger in diameter than the rubber-tired wheel when the latter tire is inflated.

With these and other objects in view, which will hereinafter appear, my invention consists in the novel constructions and combinations, as more specifically pointed out in the following specification and claims.

In the drawings, Figure 1 represents an elevation of a rubber-tired wheel, showing my armor-ring at top and bottom broken away, but complete at either side. Fig. 2 is a cross-section of the upper and lower tires, taken on line 2 2 of Fig. 1, showing the relative position of the parts when the wheel is bearing a load. Fig. 3 is an enlarged section of the steel armor-tire, showing the preferable form. Fig. 4 is an enlarged section of the diaphragm designed to be contained within the metal tire and on the outside of the rubber tire.

In all of the views like letters refer to similar parts.

In the drawings, A represents the ordinary wooden rim of a bicycle-wheel; B, the rubber tire constituting the pneumatic tire.

C is my steel armor-tire.

D is a diaphragm preferably composed of a flexible fabric and is designed to be attached to the tire C at its outside edges.

E is a yielding band, such as rubber, that may be attached around the tread of the armor-tire C for preventing noise and for increasing the tractive force of the wheel. This band may be made of any suitable material, grooved or formed as desired, and held upon the armor-tire by means of glue or the like.

The application and operation of my improved wheel are as follows:

I prefer to roll the metal tire into a continuous unbroken thin light ring of the cross-section and form shown in the drawings and preferably of spring or saw steel or material having similar qualities. The intermediate portion of the cross-section is shown somewhat heavier than the extremities of the same section to provide for the excessive wear that affects this portion of the tire while in service and to withstand the excessive strain and concussion to which this portion of the tire is subjected. The upper or extreme portions of the section are made thin or light and yielding, so that the effect of their springy nature will tend to hold the various parts in position and will contribute toward the same elastic result that follows from the use of the ordinary unprotected pneumatic tire. The continuous ring or band of elastic or yielding material D, I have called a "diaphragm." It may be made of a fabric having these qualities. Such a material as rubber or rubber cloth I have found to be excellently well adapted for the purpose. The edges are formed into a bead, as shown in Fig. 4. They may be of rubber and partially vulcanized.

My armor-tire may be readily applied to any wheel provided with the usual pneumatic tire. To apply my tire to such a wheel, the air within the pneumatic tire should be allowed to escape. The diaphragm D should then be placed within the metal tire C, and the solid beads d d' of the diaphrapm D should be placed within the internally-concave beads c c' of the tire C. Then the tire C, with the diaphragm, should be slipped over the pneumatic tire B. Then when the tire B is again inflated it will press the beads of the diaphragm into those of the tire, and by this means the tire will be held in place.

In operation the weight borne by the wheel causes the rubber tire to depress the elastic diaphragm into contact with the inside lower portion of the tire C. The circumferential length of this contact will depend somewhat upon the respective diameters of the rubber and steel tires.

Fig. 2 shows the position of the parts under this condition, wherein it will be seen that the rubber tire is not in contact at its larger diameter with the armor-tire within the region near the top of the wheel.

I wish to call especial attention to the fact that when a wheel having a circular tire in cross-section rolls over a smooth plane the two surfaces come in contact at an infinite point theoretically; but when a rubber-tired wheel moves over a smooth plane, such as an asphalt pavement, the soft yielding surface of the rubber tire flattens out and the enlarged surfaces then in contact produce a suction action, the effect of which is that at least twenty per cent. more power is required to propel a vehicle having such tires than is required when more rigid tires are employed. This conclusion has been formed from the result of actual experience.

My metallic tire has small contact with the plane over which it is traveling, but much larger contact with the rubber tire than the said rubber tire would have with the said plane when used without my metallic tire. The result of this is that there is very much less pressure per square inch of surface contact of the rubber tire, or, in other words, the load carried by the wheel is distributed over a larger traction-surface of the rubber tire when my tire is used in connection therewith than when it is not so used. Therefore to produce the same desirable results the rubber tire need not be inflated to so high a pressure when used in connection with my new armored tire as when used without it.

I have shown a diaphragm between the rubber tire and the metal armor-tire. This diaphragm is not essentially necessary, as a bead similar to that shown around the edges of the diaphragm may be formed directly upon the pneumatic tube, and this may be adapted to enter the hollow bead on the metallic tire when the former has been inflated.

It is preferable in the proper construction of my improved wheel that the armor-tire should be considerably larger than the flexible tire and that the diaphragm shall fit snugly around the flexible tire, so that when the diaphragm and armor-tire are properly attached in the manner described the said armor-tire is thereby held in position concentric with the said flexible tire; but when a load is borne by the wheel the flexible tire and cushion or diaphragm, by virtue of the yielding diaphragm, will descend deeper into the said armor-tire, leaving a correspondingly greater distance between the two tires at the top, producing, in effect, a smooth metallic endless track over which the said wheel with the flexible tire rolls.

The armored tire may be held in position by other means than that shown, and the diaphragm may also be differently attached, without departing from the spirt of my invention.

Having described my invention, what I claim as new, and desire to secure by Letters Patent of the United States, is—

1. A vehicle-wheel, substantially such as described, comprising a rim, a flexible tire fixed to the said rim, a yielding flexible diaphragm surrounding said flexible tire, a bead around both edges of the said diaphragm, a solid metallic tire circumferentially surrounding the said flexible tire, a groove around both edges of the said solid tire with which the said beads are adapted to engage.

2. A vehicle-wheel, substantially such as described, comprising a flexible tire, a support for the said flexible tire, a diaphragm surrounding said flexible tire, and a metal tire larger in diameter than the said flexible tire, the said metal tire being held in place by means of the said diaphragm.

In testimony whereof I have signed this specification, in the presence of two subscribing witnesses, this 10th day of August, 1899.

JOHN SHELLENBERGER.

Witnesses:
F. J. GOULD,
M. F. ALLEN.